United States Patent
Yanauchi et al.

(10) Patent No.: US 6,248,828 B1
(45) Date of Patent: Jun. 19, 2001

(54) PAINT OF HIGH WEATHER RESISTANCE

(75) Inventors: Kazuo Yanauchi, Funabashi; Takayoshi Yamazaki, Omiya, both of (JP)

(73) Assignee: Taisei Chemical Industries, Ltd., Tokyo (JP)

(*) Notice: Subject to any disclaimer, the term of this patent is extended or adjusted under 35 U.S.C. 154(b) by 0 days.

(21) Appl. No.: 09/369,122

(22) Filed: Aug. 5, 1999

(30) Foreign Application Priority Data

Aug. 11, 1998 (JP) .................................................. 10-226446

(51) Int. Cl.$^7$ ..................................................... C08G 18/62
(52) U.S. Cl. ............................. 525/123; 528/49; 528/75; 428/423.1
(58) Field of Search ........................ 528/75, 49; 525/123; 428/423.1

(56) References Cited

U.S. PATENT DOCUMENTS

| | | | | |
|---|---|---|---|---|
| 4,131,571 | * | 12/1978 | Crawley | 428/332 |
| 4,157,359 | * | 6/1979 | Chang et al. | 528/75 |
| 4,214,016 | * | 7/1980 | Manabe et al. | 427/404 |

FOREIGN PATENT DOCUMENTS

| | | |
|---|---|---|
| 2648367 | 5/1977 | (DE) . |
| 029598 | 5/1981 | (EP) . |
| 342974 | 11/1989 | (EP) . |
| 839844 | 5/1998 | (EP) . |
| 57-49655 | 3/1982 | (JP) . |
| 6-207142 | 7/1994 | (JP) . |
| 9-3393 | 7/1997 | (JP) . |

* cited by examiner

*Primary Examiner*—Rachel Gorr
(74) *Attorney, Agent, or Firm*—Pillsbury Winthrop LLP

(57) ABSTRACT

Provided is a paint having ultraviolet absorbability and curing function comprising as an essential component an isocyanate compound (A) which has a functional group having ultraviolet absorbability on a side chain and contains residual isocyanate group and which is obtained by reacting a part of isocyanate groups of an isocyanate prepolymer and/or monomer having at least two free isocyanate groups with an ultraviolet absorber having active hydrogen, and, if necessary, additionally comprising an optional isocyanate prepolymer (B) other than (A), and further provided is a paint superior in weather resistance obtained by reacting said paint with a polymeric compound having active hydrogen. Thus, there can be provided a paint excellent in long-term weather resistances such as gloss retention and discoloration resistance in long-term outdoor use.

3 Claims, No Drawings

PAINT OF HIGH WEATHER RESISTANCE

BACKGROUND OF THE INVENTION

The present invention relates to a paint which is used for waterproofing of rooftop, floor and outer wall of buildings, building materials, sports facilities such as tennis courts and athletic sports stadium, automobiles, household appliances, woodworking products, plastics molded articles, etc. and which can form a paint film excellent in weather resistance, for example, gloss retention, discoloration resistance, and crack resistance in long term outdoor use.

Hitherto, there have been known two-pack curing type paint compositions which comprise a composition containing active hydrogen and a composition having a functional group which reacts with active hydrogen. These paint compositions are excellent in chemical properties such as chemical resistance and, besides, can form a paint film superior in adhesion and strength and have been used as top coats of rooftop of buildings for waterproofing, outer wall of buildings, building materials and sports facilities.

Especially, when an acrylic polyol is used as the composition containing active hydrogen and an isocyanate is used as the functional group which reacts with active hydrogen, a paint film excellent in gloss, chemical properties and mechanical strength can be produced and these paint compositions have been generally used as outdoor paints.

However, when the paint films comprising the above paint compositions are used for a long period of time, they suffer from the problems in weather resistance, such as decrease of gloss, discoloration and cracking due to exposure to ultraviolet rays. For the solution of these problems, an ultraviolet absorber or a light stabilizer is added to the paint compositions. However, when used for a long time, the bleeding phenomenon of the ultraviolet absorber or light stabilizer coming to the surface is caused, and the effects of the additives cannot be retained for a long period of time.

In order to solve the above problems, attempts have been made to fix an ultraviolet absorber or a light stabilizer in the paint compositions. Thus, there has been proposed a method of copolymerizing an ultraviolet absorber or a light stabilizer which comprises an acrylic polyol having a polymerizable skeleton, and paint compositions comprising a polyisocyanate compound and a resin composition obtained by copolymerization of an acrylic polyol with an unsaturated monomer having a hydroxyl group, an unsaturated monomer having a cycloalkyl group, or the like have been reported (JP-A 9 (1997)-3393).

However, according to the above method, if the polyisocyanate compound is inferior in weather resistance or content of the polyisocyanate in the paint composition is high, the whole paint film sometimes deteriorates in weather resistance. Furthermore, in the case of the acrylic polyol of the above composition, dispersibility of pigments is inferior, and when pigment is contained, chalking phenomenon of the paint film occurs after lapse of long term, and the weather resistance cannot be sufficiently retained for a long period of time.

SUMMARY OF THE INVENTION

The object of the present invention is to provide a paint in which the ultraviolet absorber or light stabilizer added to the two-pack curing type paints does not bleed and which can provide a paint film excellent in long-term weather resistance such as gloss retention and discoloration resistance in long-term outdoor use by imparting weather resistance to both the isocyanate component and the component reacting with the isocyanate component, without damaging physical properties and chemical properties of the paint.

The inventors has continued a research on paint compositions in an attempt to retain long-term weather resistance of paints. As a result, they have succeeded in obtaining an isocyanate compound having ultraviolet absorbability by reacting a polyisocyanate compound with an ultraviolet absorber having active hydrogen, and by reacting the resulting compound with a polymeric compound having active hydrogen or a polymeric compound having active hydrogen and a functional group on pendant having ultraviolet absorbability, it has become possible to impart ultraviolet absorbability to at least one, preferably both of these reacting compounds. Thus, a paint excellent in weather resistance has been provided, and the present invention has been accomplished.

That is, the present invention relates to a paint (compound or composition) having ultraviolet absorbability and curing function and comprising as an essential component an isocyanate compound (A) which has a functional group having ultraviolet absorbability on a side chain through chemical bond and contains residual isocyanate groups and which is obtained by reacting a part of isocyanate groups of an isocyanate prepolymer and/or monomer having at least two free isocyanate groups with an ultraviolet absorber having active hydrogen and represented by the formula (1) and/or the formula (2), and, if necessary, additionally comprising an optional isocyanate prepolymer (B) other than (A), and to a paint superior in weather resistance obtained by reacting said compound or composition with a polymeric compound having active hydrogen.

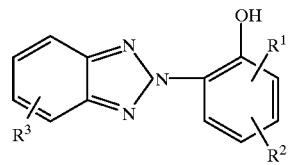

(1)

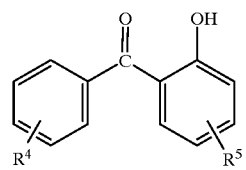

(2)

(in the formula (1), $R^1$ and $R^2$ each represent a hydrogen atom, a hydrocarbon group of 1–10 carbon atoms, or an alkoxy group of 1–10 carbon atoms, and $R^3$ represents a hydrogen atom, a halogen group, an alkoxy group of 1–10 carbon atoms, a cyano group, or a nitro group; in the formula (2), $R^4$ represents a hydrogen atom, a halogen group, an alkoxy group of 1–10 carbon atoms, or a hydrocarbon group of 1–10 carbon atoms, and $R^5$ represents hydrogen atom, an alkoxy group of 1–10 carbon atoms, or a hydrocarbon group of 1–10 carbon atoms).

Amount of the isocyanate prepolymer (B) is 0–99% by weight based on the total amount of (A) and (B).

DETAILED DESCRIPTION OF THE INVENTION

The present invention will be explained in detail. As the isocyanate prepolymers or monomers used in the present invention, mention may be made of, for example, hexamethylene diisocyanate, isophorone diisocyanate, tolylene diisocyanate, m-xylylene diisocyanate, xylylene diisocyanate, hydrogenated xylylene diisocyanate, cyclohexylmethane diisocyanate, and naphthalene diisocyanate; their isocyanurate compounds, biuret compounds, trimethylolpropane adducts, adducts with compounds having active hydrogen, such as amines, carboxylic acids, and alcohols, and adducts with derivatives thereof. These may be used each alone or in combination of two or more.

The ultraviolet absorbers having active hydrogen are those which are represented by the following formulas (1) and/or (2):

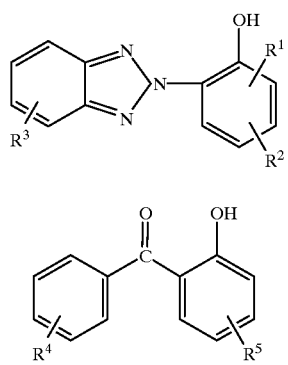

(in the formula (1), $R^1$ and $R^2$ each represent a hydrogen atom, a hydrocarbon group of 1–10 carbon atoms, or an alkoxy group of 1–10 carbon atoms, and $R^3$ represents a hydrogen atom, a halogen group, an alkoxy group of 1–10 carbon atoms, a cyano group, or a nitro group; in the formula (2), $R^4$ represents a hydrogen atom, a halogen group, an alkoxy group of 1–10 carbon atoms, or a hydrocarbon group of 1–10 carbon atoms, and $R^5$ represents hydrogen atom, an alkoxy group of 1–10 carbon atoms, or a hydrocarbon group of 1–10 carbon atoms). Examples thereof include benzotriazole ultraviolet absorbers such as 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, and 2-(2'-hydroxy-4'-octoxyphenyl)benzotriazole, and benzophenone ultraviolet absorbers such as 2-hydroxy-4-octoxybenzophenone, 2-hydroxy-4-ethoxybenzophenone, 2-hydroxy-4-methoxybenzophenone, 2-hydroxy-4-octoxy-2'-chlorobenzophenone, and 2-hydroxy-4-octoxy-3'-methylbenzophenone. These may be used each alone or in combination of two or more.

Furthermore, the reaction of the isocyanate prepolymer or monomer with the ultraviolet absorber having active hydrogen can be carried out with addition of compounds having active hydrogen, such as amines, carboxylic acids, alcohols and derivatives thereof, each alone or in combination, whereby chemical properties and physical properties of the products can be freely controlled. Solvents can be used for the reaction, and examples of preferred solvents are aromatic solvents such as toluene and xylene; ketones such as acetone, methyl ethyl ketone, and methyl isobutyl ketone; esters such as ethyl acetate, butyl acetate, and iso-butyl acetate; cellosolve acetate, and propylene glycol monomethyl ether acetate. These are used each alone or in combination. However, solvents having active hydrogen, such as alcohols, should not be used because they react with isocyanates.

Moreover, for acceleration of the reaction, urethane reaction catalysts may be used, and examples of the catalysts are organic metal catalysts such as dibutyltin diacetate and dibutyltin dilaurate, and amine catalysts such as 1,4-diazabicyclo(2,2,2)octane, triethylamine, N,N,N',N'-tetramethylethylenediamine, triethylenediamine, and dimethylaminoethanol. These are used each alone or in combination.

The isocyanate prepolymer (B) to be mixed with the component (A) is not limited. Monomers which constitute the prepolymer include, for example, isocyanate monomers such as hexamethylene diisocyanate, isophorone diisocyanate, tolylene diisocyanate, m-xylylene diisocyanate, and diphenylmethane diisocyanate, their isocyanurate compounds, biuret compounds, adducts with compounds having active hydrogen, such as amines, carboxylic acids, alcohols and derivatives thereof. These may be used each alone or in combination.

The reaction process is not limited, and general processes can be used. However, it is desirable that the reaction is effected in the absence of water. For example, solvents of urethane grade or water removers may be used. As the water removers, tosyl isocyanate, molecular sieves, etc. can be used.

In order to obtain especially excellent weather resistance and better properties, it is preferred to use isocyanurate compounds or biuret compounds of hexamethylene diisocyanate as the starting materials for the compound (A). The reaction with the ultraviolet absorber is preferably carried out in such a manner that two or more on average of isocyanate groups remain per one molecule in the isocyanate compound (A). If it is less than two on average, when the compound (A) is reacted with a curing component, crosslinking occurs insufficiently to deteriorate the properties of the paint.

As the isocyanate prepolymer (B), preferred are non-yellowing isocyanate prepolymers such as hexamethylene diisocyanate type and isophorone diisocyanate type. The isocyanate prepolymer (B) can be mixed with the isocyanate compound (A) obtained by the polymerization with the ultraviolet absorber so that the amount of (B) is 0–99% based on the total amount of (A) and (B). If the amount of (A) is less than 1%, amount of the ultraviolet absorber is conspicuously small and the desired effects cannot be obtained.

The isocyanate compound or composition comprising (A) or (A) and (B) shows no bleeding out of the ultraviolet absorber which has occurred in conventional techniques because the ultraviolet absorber is incorporated into the isocyanate compound (A) in the present invention, and this is very effective for retaining a long-term weather resistance.

Next, polymeric compounds having active hydrogen which are reacted with the above isocyanate compound or composition will be explained. The polymeric compounds are not limited as far as they can crosslink with the isocyanate to form a paint film, and as examples thereof, mention may be made of compounds such as acrylic polyols, alkyd resins, polyester polyols, polypropylene glycol, polyamino resins, and polycarboxylic acids or compositions containing these compounds. These can be used each alone or in combination.

Among them, preferred are acrylic polyols, and when the reaction product is used as a paint, a paint film excellent in weather resistance can be provided. The most preferred are acrylic polyols in which the monomer component is a polymerizable unsaturated monomer having hydroxyl group; a polymerizable unsaturated monomer having cycloalkyl group; a polymerizable light stable monomer; a polymerizable ultraviolet absorbing monomer; and a prepolymer which is a monomer having a polymerizable unsaturated ethylene group and a weight-average molecular weight of 1000–30000, and having 30% by weight or more of basic functional group and/or 30% by weight or more of acidic functional group based on the weight of the prepolymer.

In more detail, as the monomer component having a cycloalkyl group, mention may be made of, for example, cyclohexyl (meth)acrylate, methylcyclohexyl (meth) acrylate, and tert-butylcyclohexyl (meth)acrylate. These may be used each alone or in combination.

As the unsaturated monomer component having a hydroxyl group, mention may be made of, for example, hydroxyethyl (meth)acrylate, hydroxypropyle (meth) acrylate, and caprolactone-modified hydroxy (meth) acrylate. These may be used each alone or in combination.

As the polymerizable ultraviolet absorbing monomer component, mention may be made of, for example, benzotriazole type polymerizable ultraviolet absorbers such as 2-[2'-hydroxy-5'-(methacryloyloxymethyl)phenyl]-2H-benzotriazole, 2-[2'-hydroxy-5'-(methacryloyloxy-ethyl) phenyl]-2H-benzotriazole, 2-[2'-hydroxy-5'-t-butyl-3'-(methacryloyloxyethyl)phenyl]-2H-benzotriazole, and 2-[2'-hydroxy-5'-(methacryloyloxyethyl)phenyl]-5-chloro-2H-benzotriazole, and benzophenone type polymerizable ultraviolet absorbers such as 2-hydroxy-4-(3-acryloxy-2-hydroxypropoxy)benzophenone, 2-hydroxy-4-(3-methacryloyloxy-2-hydroxypropoxy)benzophenone. and 2'-dihydroxy-4-(3-methacryloyloxy-2-hydroxyprpoxy) benzophenone. These may be used each alone or in combination, and amount of the component is preferably 0.1–7% by weight based on the polymerizable monomer components.

As the polymerizable light stable monomer component, mention may be made of, for example, hindered amine light stabilizers such as 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, and 4-(meth)acryloyl-amino-1,2,2,6,6-pentamethylpiperidine. These may be used each alone or in combination, and amount of the component is preferably 0.1–7% by weight based on the polymerizable monomer components.

In the case of the prepolymer which is a monomer having a polymerizable unsaturated ethylene group and a weight-average molecular weight of 1000–30000, and having 30% by weight or more of basic functional group and/or 30% by weight or more of acidic functional group based on the weight of the prepolymer, the prepolymer is prepared in the following manner. As for the prepolymer having an amino group, an amino-group containing monomer such as dimethylaminomethyl methacrylate, diethylaminomethyl methacrylate, dibutylaminomethyl methacrylate, or dihexylaminomethyl methacrylate each alone or in combination is used as the polymerizable compound having an amino group in an amount of 30% or more based on the prepolymer constituents, and one or more of them are polymerized using a polymerization initiator having a carboxyl group at an end. Then, the resulting product is subjected to addition reaction with a polymerizable monomer having an epoxy group in the presence of a polymerization inhibitor and a tertiary amine.

As for the prepolymer having a carboxylic acid group, a polymerizable monomer having a carboxylic acid group such as acrylic acid, maleic acid, itaconic acid, 2-acryloyloxyethylsuccinic acid, or 2-acryloyloxyethyl-phthalic acid each alone or in combination is used as the polymerizable compound having a carboxyl group in an amount of 30% or more based on the prepolymer constituents, and one or more of them are polymerized using a conventional polymerization initiator. Then, the resulting product is subjected to addition reaction with a polymerizable monomer having an epoxy group in the presence of a polymerization inhibitor and a tertiary amine.

As other polymerizable monomers, mention may be made of, for example, methyl (meth)acrylate, ethyl (meth) acrylate, propyl (meth)acrylate, isopropyl (meth)acrylate, butyl (meth)acrylate, isobutyl (meth)acrylate, sec-butyl (meth)acrylate, tert-butyl (meth)acrylate, isopentyl (meth) acrylate, neopentyl (meth)acrylate, hexyl (meth)acrylate, heptyl (meth)acrylate, octyl (meth)acrylate, 2-ethylhexyl (meth)acrylate, stearyl (meth)acrylate, benzyl (meth) acrylate, styrene, a-methylstyrene, vinyltoluene, vinylidene chloride, and vinyl acetate. These may be used each alone or in combination.

The method of copolymerizing the above monomer compositions is not limited, but solution polymerization is preferred. The solvents used in the copolymerization include, for example, aromatic solvents such as toluene and xylene, ketones such as acetone, methyl ethyl ketone, and methyl isobutyl ketone, esters such as ethyl acetate and butyl acetate, cellosolve acetate, and propylene glycol monomethyl ether acetate. These may be used each alone or in combination.

Polymerization initiators are used in the copolymerization of the above monomer compositions, and they may be the usual polymerization initiators, e.g., azo type such as azobisisobutyronitrile, and peroxide type such as benzoyl peroxide. These may be used each alone or in combination.

Since the prepolymer having a polymerizable ethylenically functional group which is a constituent of the polymeric compound having active hydrogen contains a basic functional group and/or an acidic functional group, the finally obtained paint is excellent in dispersibility for any pigments such as basic pigments, acidic pigments, or mixtures thereof, and consequently weather resistance of the paint composition can be improved.

The paint composition of the present invention can optionally contain accelerators for the reaction with isocyanate, organic solvents, additives, inorganic pigments, organic pigments, and extender pigments. The reaction accelerators include, for example, organic metal catalysts such as butyltin diacetate and dibutyltin dilaurate, and amine catalysts such as 1,4-diazabicyclo(2,2,2)octane, triethylamine, N,N,N',N'-tetramethylethylenediamine, triethylenediamine, and dimethylaminoethanol. These may be used each alone or in combination of two or more. The organic solvents include, for example, aromatic solvents such as toluene and xylene, ketones such as acetone, methyl ethyl ketone, and methyl isobutyl ketone, esters such as ethyl acetate and butyl acetate, cellosolve acetate, and propylene glycol monomethyl ether acetate. These may be used each alone or in combination.

The additives include one or more of various additives for paints, such as antifoaming agents, dispersants, leveling agents, adhesion improvers, plasticizers, stabilizers, and anti-settling agents. The inorganic pigments include, for example, titanium oxide, zinc oxide, chrome yellow, red iron oxide, yellow iron oxide, iron black, and carbon black. The organic pigments include, for example, azo compounds and phthalocyanine compounds. The extender pigments include, for example, calcium carbonate, silicon oxide, clay, organic bentonite, and silica powder. These may be used each alone or in combination.

The materials which can be coated with the paint composition of the present invention are not limited. Examples of the materials to be coated are plastics such as urethane, FRP (fiber-reinforced plastics), polypropylene, polycarbonate, and acrylic resin, and woods, metals, glasses, and ceramics. The long-term weather resistance of these materials can be retained by coating the surface with the paint composition of the present invention. That is, the paint composition of the present invention can be widely used as coating agents for plastic molded articles, household appliances, metallic articles, automobiles, constructions, building materials, sports facilities, woodworking, etc.

DESCRIPTION OF PREFERRED EMBODIMENTS

The present invention will be explained by the following examples.

EXAMPLE 1

(Preparation of ultraviolet absorber-containing isocyanate polymer (component A)):

24 Parts by weight of butyl acetate, 12 parts by weight of hexamethylene diisocyanurate, 2 parts by weight of 2(2'-hydroxy-5'-methylphenyl)benzotriazole, and 0.01 part by weight of dibutyltin dilaurate were charged in a flask equipped with a stirrer, a condenser tube, and a thermometer, and heated to 70C in a nitrogen atmosphere to carry out the reaction for 3 hours. The reaction product was cooled to room temperature and mixed with 38 parts by weight of an isocyanate prepolymer (Trade mark: ACRIT 8XA-012 manufactured by Taisei Kako Co., Ltd.; nonvolatile content: 50%; isocyanate content: 3.1%) to obtain a composition.

EXAMPLES 2–8

Isocyanate prepolymers were obtained in the same manner as in Example 1 according to the formulations shown in Table 1. Property values of the resulting prepolymers are shown in Table 2.

TABLE 1

Formulations of isocyanate prepolymers (Examples)

| | Example | | | | | | |
|---|---|---|---|---|---|---|---|
| | 2 | 3 | 4 | 5 | 6 | 7 | 8 |
| Isocyanurate compound of HMDI | 12 | | | | | | |
| TMP adduct of HMDI | | 12 | 12 | | | | |
| Biuret compound of HMDI | | | | 12 | 12 | | |
| HMDI monomer | | | | | | 12 | 12 |
| 2(2'-hydroxy-5'-methyl-phenyl)benzotriazole | | 2 | | 2 | | 1 | |
| 2-hydroxy-4-n-octoxy-benzophenone | 2 | | 2 | | 2 | | 1 |
| PPG(average molecular weight: 1000, containing 3 hydroxyl groups in one molecule) | | | | | | 23 | 23 |
| Butyl acetate | 24 | 24 | 24 | 24 | 24 | 36 | 36 |
| Dibutyltin dilaurate | 0.01 | 0.01 | 0.01 | 0.01 | 0.01 | 0.01 | 0.01 |
| Isocyanate prepolymer* | 38 | 38 | 38 | 38 | 38 | 72 | 72 |

In the above table, "TMP", "PPG" and "HMDI" are abbreviations of "trimethylolpropane", "polypropylene glycol" and "hexamethylene diisocyanate", respectively.
*Trade mark ACRIT 8XA-012 manufactured by Taisei Kako Co., Ltd.

TABLE 2

Property values of isocyanate prepolymers

| | Example | | | | | | | |
|---|---|---|---|---|---|---|---|---|
| | 1 | 2 | 3 | 4 | 5 | 6 | 7 | 8 |
| Appearance | Transparent | Transparent | Transparent | Transparent | Transparent | Transparent | Transparent | Transparent |
| Nonvolatile content (%) | 43 | 43 | 43 | 43 | 43 | 43 | 50 | 50 |
| Viscosity (mPa · s) | 20 | 22 | 25 | 25 | 21 | 19 | 60 | 60 |
| Content of NCO group (%) | 4.3 | 4.5 | 3.0 | 3.2 | 4.8 | 4.9 | 3.4 | 3.5 |

Comparative Examples 1–4

Isocyanate prepolymers were obtained in the same manner as in Example 1 according to the formulations shown in Table 3. Property values of the resulting prepolymers are shown in Table 4.

TABLE 3

Formulations of isocyanate prepolymers (Comparative Examples)

| | Comparative Example | | | |
|---|---|---|---|---|
| | 1 | 2 | 3 | 4 |
| Isocyanurate compound of HMDI | 12 | | | |
| TMP adduct of HMDI | | 12 | | |
| Biuret compound of HMDI | | | 12 | |
| HMDI monomer | | | | 12 |
| 2(2'-hydroxy-5'-methyl-phenyl)benzotriazole | | | | |
| 2-hydroxy-4-n-octoxy-benzophenone | | | | |
| PPG(average molecular weight: 1000, containing 3 hydroxyl groups in one molecule) | | | | 23 |
| Butyl acetate | 24 | 24 | 24 | 35 |
| Dibutyltin dilaurate | | | | 0.01 |
| Isocyanate prepolymer* | 36 | 36 | 36 | 70 |

*Trade mark ACRIT 8XA-012 manufactured by Taisei Kako Co., Ltd.

TABLE 4

Property values of isocyanate prepolymer

| | Comparative Example | | | |
|---|---|---|---|---|
| | 1 | 2 | 3 | 4 |
| Appearance | Transparent | Transparent | Transparent | Transparent |
| Nonvolatile content (%) | 42 | 42 | 42 | 50 |
| Viscosity (mPa · s) | 18 | 20 | 22 | 60 |
| Content of NCO group (%) | 5.0 | 3.6 | 5.5 | 3.7 |

EXAMPLE 9

(Preparation of acrylic polyol):

10 parts by weight of butyl acetate and 10 parts by weight of xylene were charged in a flask equipped with a stirrer, a dropping funnel, a condenser tube, and a thermometer, and heated to 120° C. in a nitrogen atmosphere. Polymerizable monomers were charged in the dropping funnel according to the following formulation and added dropwise at an equal rate over a period of 2 hours.

| | Part by weight |
|---|---|
| Cyclohexyl methacrylate | 25 |
| Methyl methacrylate | 6 |
| Butyl acrylate | 10 |
| 2-hydroxyethyl methacrylate | 7 |
| Acrylic acid | 0.3 |
| 2-[2'-hydroxy-5'-(methacryloyl)phenyl]benzetrianzole | 0.5 |
| Methacryloylamino-2,2,6,6-tetramethyl piperidine | 0.5 |
| Basic prepolymer | 2 |
| Acidic prepolymer | 2 |
| Azobisisobutyronitrile | 1 |

After lapse of 1 hour from completion of the addition, a mixed solution comprising 0.2 part by weight of azobisisobutyronitrile and 10 parts by weight of xylene was added dropwise at an equal rate over a period of 2 hours. After completion of the addition, the content was kept at 120° C. for 1 hour and, after cooling, diluted with 15.5 parts by weight of xylene to obtain an acrylic polyol having a viscosity of 2500 mPa s, a nonvolatile content of 50%, and a weight-average molecular weight of 32000.

The acidic prepolymer (oligomer) and the basic prepolymer (oligomer) were prepared in the following manners. Preparation of the basic prepolymer: 47 Parts by weight of butyl acetate was charged in a flask equipped with a stirrer, a dropping funnel, a condenser tube, and a thermometer, and heated to 120° C. in a nitrogen atmosphere. A mixture comprising 4.3 parts by weight of 4,4'-azobis-4-cyanovaleric acid, 1.4 part by weight of triethylamine and 22.0 parts by weight of cellosolve acetate, and a mixture comprising 17.3 parts by weight of dimethylaminoethyl methacrylate and 5 parts by weight of butyl acetate were separately charged in the dropping funnel and added dropwise at an equal rate over a period of 3 hours. After 30 minutes from completion of the addition, 0.01 part by weight of hydroquinone was added, and then 3.6 parts by weight of glycidyl methacrylate was added, followed by reaction for further 2 hours to prepare the basic prepolymer.

Preparation of the acidic prepolymer: 35 Parts parts by weight of butyl acetate was charged in a flask equipped with a stirrer, a dropping funnel, a condenser tube, and a thermometer, and heated to 120° C. in a nitrogen atmosphere. A mixture comprising 20 parts by weight of 2-methacryloyloxyethylphthalic acid, 4 parts by weight of azobisisobutyronitrile and 10 parts by weight of butyl acetate was charged in the dropping funnel and added dropwise at an equal rate over a period of 3 hours. After 30 minutes from completion of the addition, 0.01 part by weight of hydroquinone was added, and then 2.0 parts by weight of glycidyl methacrylate and 0.6 part by weight of triethylamine were added, followed by reaction for further 2 hours to prepare the acidic prepolymer.

Comparative Example 5

Polymerization was carried out in the same manner as in Example 9 according to the following formulation of the polymerizable monomers.

| | Part by weight |
|---|---|
| Cyclohexyl methacrylate | 25 |
| Methyl methacrylate | 6 |
| Butyl acrylate | 10 |
| 2-hydroxyethyl methacrylate | 7 |
| Acrylic acid | 0.3 |
| Azobisisobutyronitrile | 1 |

The above acrylic polyol had property values of a viscosity of 2200 mPa s, a nonvolatile content of 49%, and a weight-average molecular weight of 30000.

EXAMPLE 10

Using the varnish obtained in Example 9, pigment was dispersed at the following formulation by a sand mill to obtain black and white paints.

| Mill base formulation (white): | |
|---|---|
| Titanium oxide | 20 parts by weight |
| Varnish | 10 parts by weight |
| Xylene | 5 parts by weight |
| | 35 parts by weight |
| Mill base formulation (black): | |
| Carbon | 5 parts by weight |
| Varnish | 10 parts by weight |
| Xylene | 10 parts by weight |
| | 25 parts by weight |
| Let down formulation (white): | |
| Mill base (white) | 35 parts by weight |
| Varnish | 50 parts by weight |
| Xylene | 15 parts by weight |
| | 100 parts by weight |
| Let down formulation (black): | |
| Mill base (black) | 25 parts by weight |
| Varnish | 50 parts by weight |
| Xylene | 15 parts by weight |
| | 100 parts by weight |

A paint comprising the above white paint and the above black paint at a ratio of 8:2 was mixed with the isocyanate prepolymers obtained in Examples 1–8 so as to give a ratio of NCO group/OH group=1/1. The resulting mixtures were coated on an urethane plate and subjected to an accelerated test for 2000 hours by a carbon sunshine weather meter, and a gloss retention rate was calculated on the basis of initial gloss value.

Moreover, the paints were applied to a glass plate at a film thickness of 200 microns by an applicator. Just before drying to the touch, the films were subjected to rubbing test with fingers, and color difference between the rubbed portion and the unrubbed portion was measured to evaluate the dispersibility. The results are shown in Table 5.

Comparative Example 6

White and black paints were prepared in the same manner as in Example 10 using the varnish obtained in Comparative Example 5. A paint obtained by similarly mixing the white paint and the black paint at 8:2 was similarly mixed with the isocyanate prepolymers obtained in Comparative Examples 1–4, followed by subjecting to the same tests as in Example 10. The results are shown in Table 5.

TABLE 5

Formulations of paints and test results

|  | Example | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Isocyanate composition (part by weight) | 31 | 30 | 45 | 42 | 28 | 27 | 39 | 39 | 27 | 38 | 24 | 36 |
| Paint obtained in Example 10 (part by weight) | 100 | 100 | 100 | 100 | 100 | 100 | 100 | 100 |  |  |  |  |
| Paint obtained in Comparative Example 6 (part by weight) |  |  |  |  |  |  |  |  | 100 | 100 | 100 | 100 |
| Gloss retention after acceleration (%) | 86 | 83 | 84 | 82 | 85 | 80 | 82 | 81 | 69 | 65 | 68 | 62 |
| Pigment separation | ○ | ○ | ○ | ○ | ○ | ○ | ○ | ○ | x | x | x | x |

The results of evaluation on pigment separation as floating or flooding are shown by the following grades.

| Color difference ΔE | Grade |
| --- | --- |
| Less than 0.5 | ○ |
| 0.5–1.5 | X |

It can be seen that the systems using the isocyanate compositions and the acrylic polyols of the Examples were superior in gloss retention, dispersibility and weather resistance.

According to the present invention, there is provided a paint excellent in long-term weather resistances such as gloss retention and discoloration resistance in long-term outdoor use.

When the ultraviolet absorber-polymerized type isocyanate composition of the present invention is used, long-term weather resistance of the paint film can be improved without damaging properties by selecting a composition which is capable of reacting with the said isocyanate composition and is superior in pigment dispersibility and weather resistance. Thus, the composition can be used for paint and ink which are required to have weather resistance.

What is claimed is:
1. A paint superior in weather resistance obtained by reacting a polymeric compound having active hydrogen with a compound or composition having ultraviolet absorbability and curing function comprising as an essential component an isocyanate compound (A) which has a functional group having ultraviolet absorbability on a side chain and contains residual isocyanate group and which is obtained by reacting a part of isocyanate groups of an isocyanate prepolymer and/or monomer having at least two free isocyanate groups with an ultraviolet absorber having active hydrogen and represented by the formula (I) and/or the formula (2), and, if necessary, additionally comprising an isocyanate optional prepolymer (B) other than (A):

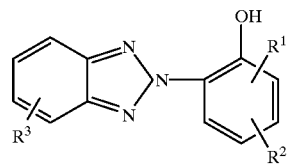

(1)

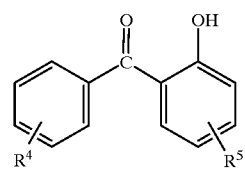

(2)

wherein the formula (1), $R^1$ and $R^2$ each represent a hydrogen atom, a hydrogen group of 1–10 carbon atoms, or an alkoxy group of 1–10 carbon atoms, and $R^3$ represents a hydrogen atom, a halogen group, an alkoxy group of 1–10 carbon atoms, a cyano group, or a nitro group; in the formula (2), $R^4$ represents a hydrogen atom, a halogen group, an alkoxy group of 1–10 carbon atoms, or a hydrocarbon group of 1–10 carbon atoms, and $R^5$ represents hydrogen atom, an alkoxy group of 1–10 carbon atoms, or a hydrocarbon group of 1–10 carbon atoms; and wherein the polymeric compound having active hydrogen is an acrylic polyol in which the monomer component constituting the acrylic polyol is a polymerizable unsaturated monomer having a hydroxyl group; a polymerizable unsaturated monomer having a cycloalkyl group; a polymerizable light stable monomer; a polymerizable ultraviolet absorbing monomer; and a prepolymer which is a monomer having a polymerizable unsaturated ethylene group and a weight average molecular weight of 1000–30000, and having 30% by weight or more of a basic functional group and/or 30% by weight or more of an acidic functional group based on the weight of the prepolymer.

2. A paint according to claim 1 wherein the isocyanate monomer or prepolymer is hexamethylene diisocyanate, an isocyanurate trimer or biuret compound of hexamethylene diisocyanate, an adduct compound of a polyol, or a prepolymer thereof.

3. An article coated with the paint of claim 1.

* * * * *